United States Patent [19]
Asprey et al.

[11] Patent Number: 5,426,771
[45] Date of Patent: Jun. 20, 1995

[54] SYSTEM AND METHOD FOR PERFORMING HIGH-SPED CACHE MEMORY WRITES

[75] Inventors: Thomas A. Asprey, Boulder; Craig A. Gleason, Ft. Collins, both of Colo.

[73] Assignee: Hewlett-Packard Company, Palo Alto, Calif.

[21] Appl. No.: 913,571

[22] Filed: Jul. 14, 1992

[51] Int. Cl.[6] .............................. G06F 12/08
[52] U.S. Cl. .................... 395/550; 364/DIG. 1; 364/243.41; 364/271.5; 364/248.6; 364/DIG. 2; 364/964.2; 364/950.4; 364/953.7
[58] Field of Search ................. 395/550, 425

[56] References Cited

U.S. PATENT DOCUMENTS

| | | | |
|---|---|---|---|
| 4,084,234 | 4/1978 | Calle et al. | 364/DIG. 1 |
| 4,195,341 | 3/1980 | Joyce et al. | 364/DIG. 1 |
| 4,392,200 | 7/1983 | Arulpragasam et al. | 364/DIG. 1 |
| 5,287,481 | 2/1994 | Lin | 364/DIG. 1 |

*Primary Examiner*—Thomas M. Heckler

[57] ABSTRACT

A system and method for improving cache memory write cycle timing in a microprocessor system, having static random access memory (SRAM) cache memory, using two out-of-phase clock signals and delayed variants thereof. The present invention includes the steps of sending a write address to the cache memory at a positive transition of the first out-of-phase clock signal that marks the beginning of the write cycle; causing a write control signal to be asserted at a time marked by next occurring positive transition of the second out-of-phase clock signal; sending the data to be written to the SRAM at a time marked by a drive clock signal; and ending the write cycle at a time marked by a end-write clock. The drive clock signal is provided by delaying the first out-of-phase clock signal. The amount of delay introduced in providing the drive clock signal is selected to allow the SRAM sufficient time to tri-state its drivers after receiving the write-control signal. The end write signal is provided by delaying the second out-of-phase clock signal. The amount of delay introduced in providing the end-write clock is selected to allow the SRAM sufficient time to read data to be written off of the data bus. The delay is introduced into the clock signals using printed circuit trace delay lines. The length of the printed circuit trace delay lines is selected such that the drive clock and end-write clock transitions occur at the optimum time.

20 Claims, 12 Drawing Sheets

SYSTEM AND METHOD FOR PERFORMING HIGH-SPED CACHE MEMORY WRITES

BACKGROUND OF THE INVENTION

1. Field Of The Invention

The present invention relates generally to high speed central processor unit (CPU) cache memory, and more particularly to a system and method for improving processor system performance by optimizing the cache memory write time.

2. Related Art

Computer and microprocessor systems typically employ random access memory (RAM) chips for storing instructions to be executed and data to be manipulated. To utilize this memory, the microprocessor must 'access' the information stored in the memory. Accessing memory involves two steps. The first step is addressing the specific memory location from which the data is to be retrieved or to which the data is to be written. The second step is actually retrieving the data from, or writing data to that specific memory location.

Accessing the memory for instruction fetching and for read and write operations involves a relatively significant amount of time. In fact, the time required to access computer memory is often a rate-determining factor that constrains the speed at which the computer system may operate. Even if the CPU can operate at greater speeds, operations can only be performed as quickly as the data can be transferred between memory and the CPU. In other words, computer and processor systems can operate only as fast as the instructions can be retrieved from memory, or as fast as the data required to execute those instructions can be written to or retrieved from memory.

To increase the overall speed at which the system performs its designated operations, conventional system designs have incorporated high-speed memory architectures. Such architectures employ high-speed cache memory to achieve rapid data transfer. Cache memories are typically built from bipolar or bipolar/CMOS (complimentary metal oxide semiconductor) devices which are faster than the traditional metal-oxide-semiconductor (MOS) devices. Cache memories are often designed using static RAM (SRAM) chips because SRAMs provide fast access times.

Bipolar cache memories are more costly than their slower MOS counterparts. Consequently, their application is typically limited to storing information most frequently used by the computer systems. Other information, not as frequently used, is stored in more cost effective, but slower, MOS DRAM chips. However, even faster cache memories have continued to limit the speed of conventional computer systems.

Market demands continue to require systems operating at high frequencies. Current demands are for systems operating in the range of 80 to 100 MHz. As a result, conventional system designs have begun using faster SRAMs in an attempt to operate at these frequencies. However, read and write timing limitations constrain these conventional systems to operate at frequencies somewhat less than the maximum cache access cycle frequencies.

Ideally, the maximum frequency, $F_c$ of accessing the cache is the reciprocal of the cache access cycle time, $T_c$. Therefore, a 10 nanosecond cache RAM chip can $$F_c = \frac{1}{T_c} \quad (1)$$

theoretically operate at 100 MHz, while an 8 nanosecond chip can theoretically operate at 125 Mhz.

Theoretically, the actual processor frequency, $F_a$ could be as high as $F_c$. In fact, with some conventional read techniques, read operations can be as fast as $T_c$. However, due to write timing limitations and timing uncertainties, this maximum processor frequency may not be attained in conventional systems. Typically, the ratio of actual processor frequency, $F_a$, to cache access frequency, $F_c$, is approximately 1.25. In other words, conventional systems operate 25% slower than the theoretical maximum frequency. Thus, in conventional systems using 10 nanosecond SRAMs the actual processor cycle time, $T_a$, is limited to approximately 12.5 nanoseconds, considerably greater than the cache access time $T_c$.

$$T_a = \frac{1}{F_a} \quad (2)$$

As mentioned above, write timing limitations are the reason the system must operate slower than the maximum SRAM speed in the frequency range of 80–100 MHz. There are several system characteristics that contribute to these write timing limitations. These characteristics include the delays associated with driving the addresses and control signals to the SRAMs. Additionally, uncertainty in these delays requires additional time be allowed for accessing the cache. Conventional write timing methods typically use two or three control signals to perform a write operation. These signals are a write control signal, a chip enable signal, and an output enable signal. These signals are set true (asserted) and reset false using control clock edges. Performing the write operation depends on asserting these signals before certain steps can be performed. However, there is imprecision associated with the temporal placement of the control clock edges and therefore imprecision associated with asserting and resetting each of the three control signals. As a result, additional time must be included in the write operation (i.e., $T_a$ must be increased) to account for the imprecision in placement of these three signals.

The write cycle timing algorithm must be designed to account for the worst-case placement of all three control signals. Therefore, a longer write-cycle time is needed. Consequently, longer processor cycle time $T_a$ is required, or an increased number of processor cycles are required to perform the write operation. A longer $T_a$ results in a slower system operation. If an increased number of processor cycles is required to perform a write operation, write operations will impede system performance.

To operate at frequencies of 80 to 100 Mhz, designers must keep $T_a$ down to 10 to 12.5 nanoseconds. With a $T_a$ of 10 to 12.5 nanoseconds and a long write cycle time, conventional systems are forced to increase the number of processor cycles required to perform a write operation to more than two.

Designers of conventional systems have implemented a number of techniques in an attempt to minimize the actual processor cycle time, $T_a$. In one technique, separate cache control units (CCUs) have been used to direct access to the cache RAM. However, this approach requires the addition of buffers and latches to facilitate addressing. This additional circuitry adds delay into the read and write operations. Also, there are additional costs associated with this circuitry, and it consumes power and space.

Another approach in conventional systems has been to customize SRAMs to incorporate latches and/or multiplexers. This is done in an attempt to minimize the uncertainty in the control signals by holding the data in these latches. However, the access time at which the SRAM can function is increased in these applications because of the additional circuitry required. Also, customized SRAMs cost more, require more control, and because they have more levels of circuitry, have an inherently slower access time.

Each instruction in a microprocessor cache memory system requires that a read operation be performed to execute that instruction. Only a small percentage (typically 20–25%) of the instructions require that a write operation be performed. Therefore, microprocessor cache memory systems are optimized for the read cycle, and $T_a$ is chosen based on the read cycle.

What is needed is a system and method for minimizing the amount of time required to write data to an SRAM. The coordination of the write cycle time with the read cycle time is critical for minimizing $T_a$. $T_a$ is at a minimum when the write sequence time is the same as the read sequence time (or an integer multiple thereof). If the write cycle takes longer than the read cycle (or multiple read cycles), $T_a$ must be longer than the read cycle and the increase in $T_a$ is wasted time. Additionally, the number of cycles required for write operations should be minimized.

SUMMARY OF THE INVENTION

The present invention is directed to a system and method for improving the performance of computer or microprocessor systems by decreasing the amount of time required to perform cache memory write operations (i.e., by decreasing the write-cycle time). Thus, the present invention allows the processor cycle time $T_a$ of a CPU to approach the access time $T_c$ of its associated cache memory, and allows the write operation to occur in a minimum number of processor cycles.

A key feature of the present invention is that only one control signal, the write control signal is required to perform write operations. Additional control signals used by conventional systems are not required, and the uncertainties associated with temporal placement of these additional control signals is eliminated. Thus, additional time in the write cycle does not have to be included to account for these uncertainties. This feature not only decreases $T_c$, but also saves board space and I/O pins on the processor. Additionally, in systems configured with multiple groups of SRAMs, only one signal, the write enable signal, is needed for each group.

According to the present invention, the sequence for performing memory write operations is controlled using two out-of-phase clock signals, and two delayed clock signals derived from the two out-of-phase clock signals. At the beginning of the write operation, a positive transition of a second out-of-phase clock signal is used to drive a write address to the cache memory. A first positive transition of a first out-of-phase clock signal is used to assert the cache memory write control signal, thereby signalling the cache memory to enter a data acceptance mode. The timing of this positive transition of the first out-of-phase clock signal is selected so that the write-control signal is asserted immediately after the write address is set up at the cache memory.

In some environments, data from a previous read operation may be held on a data bus until after the current write operation has begun. In these environments, the write-control signal can not be asserted until after the data from the previous operation is no longer required to be valid for that operation to complete.

A next occurring positive transition of a drive clock signal is used to drive data to be written from the CPU to the cache memory. The drive clock signal is generated by delaying the second out-of-phase clock signal. The amount of delay introduced to generate the drive clock signal is chosen to drive the data as soon as possible after the cache memory has had sufficient time to tri-state its data drivers. The data to be written is held on the data bus for a sufficient amount of time to allow the cache memory to write the data to its proper address.

At the next occurring positive transition of an end-write clock signal, the write-control signal is reset. This marks the end of the write cycle and a subsequent cycle may now begin. The timing of the end-write clock transition is chosen to allow the maximum time for data to be written while ending the write cycle before a new address is received by the cache for the next operation. The end-write clock signal is obtained by delaying the first out-of-phase clock signal.

The delay in the out-of-phase clock signals is introduced by routing the original signals each through a printed circuit trace delay line. The length of each delay line is chosen to provide the correct amount of delay required for placing the edges of the signals at the optimum time.

An additional feature of the present invention is it allows system performance to be optimized using industry-standard asynchronous SRAMs rather than using a custom cache solution. These chips typically provide the fastest access times, and provide the lowest cost per bit of information at a given speed. In addition, the present invention provides the flexibility to adjust the timing of the write enable signal and the timing of the data drive. This flexibility allows a system using the present invention to be 'tuned' to SRAM timing specifications. Thus, the system may be optimized for the particular SRAM used.

Another feature of the invention is that it provides optimum system performance for a given family of SRAM chips, including the fastest 'state-of-the-art' SRAM chips.

Still another feature of the invention is the write timing does not limit the read access timing, and is limited to only two clock cycles.

Yet another feature of this invention is that it allows operation at lower frequencies without a need to adjust the amount of delay introduced into the out-of-phase clock signals. A system designed according to the present invention, for use at a given frequency, with SRAMs specified to operate at a given speed, can be operated at a lower frequency without changing the amount of delay. This feature may be particularly useful for applications using slower SRAMs, or during testing operations at slower processor speeds.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein.

Figure 1:
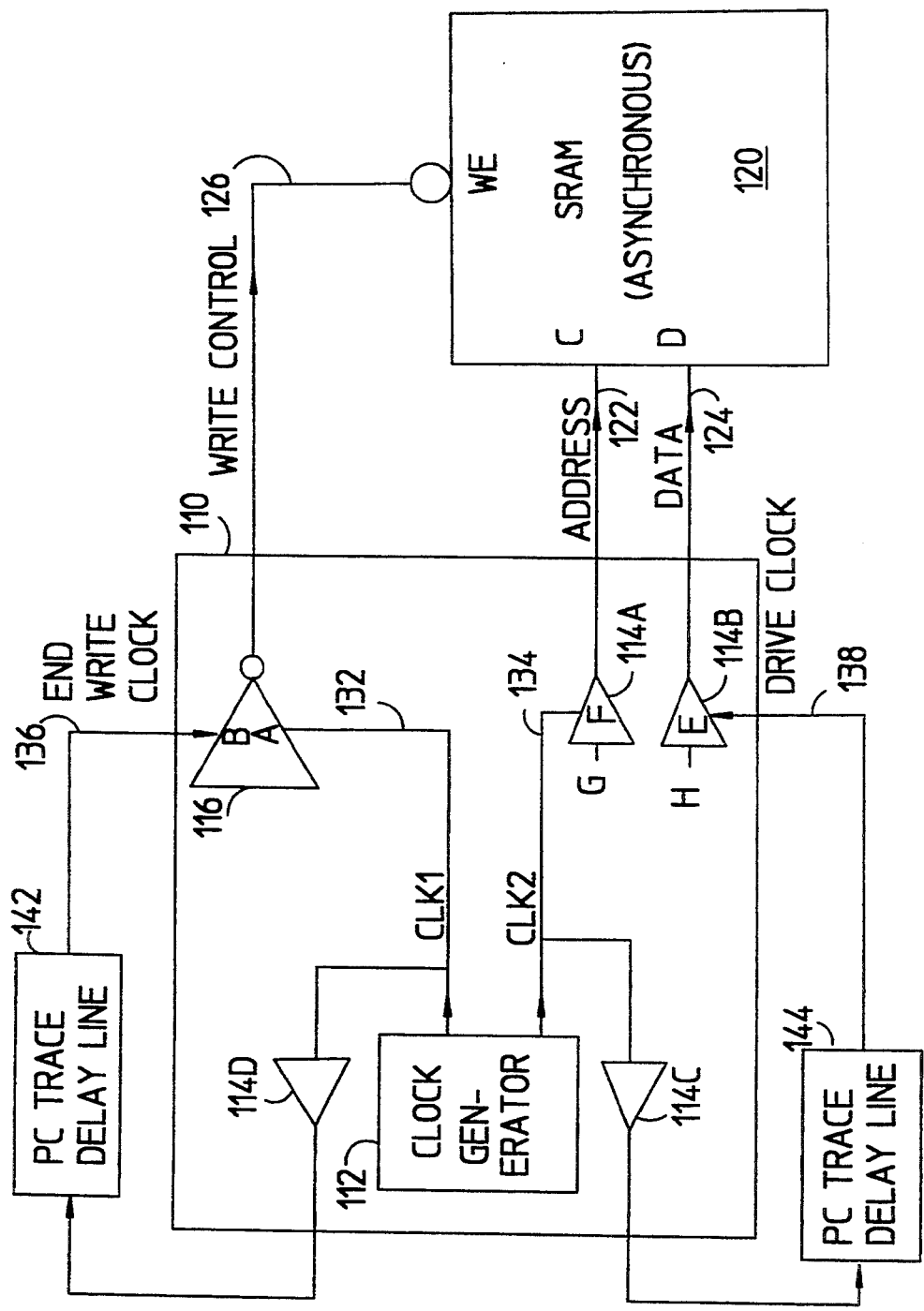
FIG. 1 is a block diagram illustrating a cache memory write system according to the present invention.

In the drawings, the left-most digit of a reference number identifies the drawing in which the reference number first appears.

DETAILED DESCRIPTION OF THE INVENTION

Table of Contents
1. Introduction
2. Overview of the Present Invention
3. Sample Environment of the Invention
4. The Apparatus According to an Embodiment of the Present Invention
5. A System and Method According to an Embodiment of the Present Invention
6. An Embodiment of the Present Invention for SRAMs With A Very Short Address Set-Up Time
7. An Alternative Embodiment of the Present Invention Using Three Delay Elements
8. An Alternate Embodiment of the Present Invention Using One Original Clock Signal
9. An Embodiment Using Sequencing Logic to Control Write Cycle Timing
10. Controlling Multiple Groups of SRAMs
11. Conclusion
  1. Introduction The present invention is directed to a system and method for optimizing computer or microprocessor system performance by minimizing the amount of time needed to perform a write operation. A preferred embodiment described below uses two clock signals, and delayed variants of these clock signals to control the write cycle timing. As a result of the manner in which these signals are utilized, the write cycle according to the present invention does not need chip enable and output enable signals. Uncertainties normally associated with such signals are therefore not a factor in timing the write sequence of the present invention. Thus, the present invention is much faster than conventional write techniques.

Alternative embodiments of the present invention contemplate other systems and/or methods for achieving the same result. These alternative embodiments are discussed as variations on the preferred embodiment described below.

2. Overview of the Present Invention

The write cycle begins on a positive transition of a clock signal, CLK2. At this time a cache memory address to which the data is to be written is sent to the SRAM. The address is 'set up' in the SRAM, and at the first positive transition of a clock signal, CLK1, a write-control signal is asserted (telling the SRAM to enter the write mode). Address set up entails holding the address valid at the SRAM address ports for an amount of time required for the SRAM to recognize the address.

A delayed variant of CLK2, designated drive clock, is used to drive the data to be written to the SRAM when the SRAM is ready to receive such data. The data must be driven as early as possible so that it will be valid long enough for the data to meet SRAM data set up specifications. Similar to address set up specifications, data set up specifications define the length of time that data must be valid on the bus to be written to the SRAM. The data remains valid at the SRAM inputs until a delayed variant of CLK1, designated end-write clock, makes a positive transition causing the write-control signal to be reset. At this point, the write operation is finished and the system may perform another operation.

The invention uses a unique combination of clock transitions and delayed-clock transitions to control the write cycle operation. The amount of delay introduced in each clock signal is selected to optimize the point in time at which the write control is asserted and reset, and the time at which the data is driven to the SRAM. Edge placement is selected based on the timing specifications for the particular SRAM selected.

3. Sample Environment of the Invention

Figure 8:
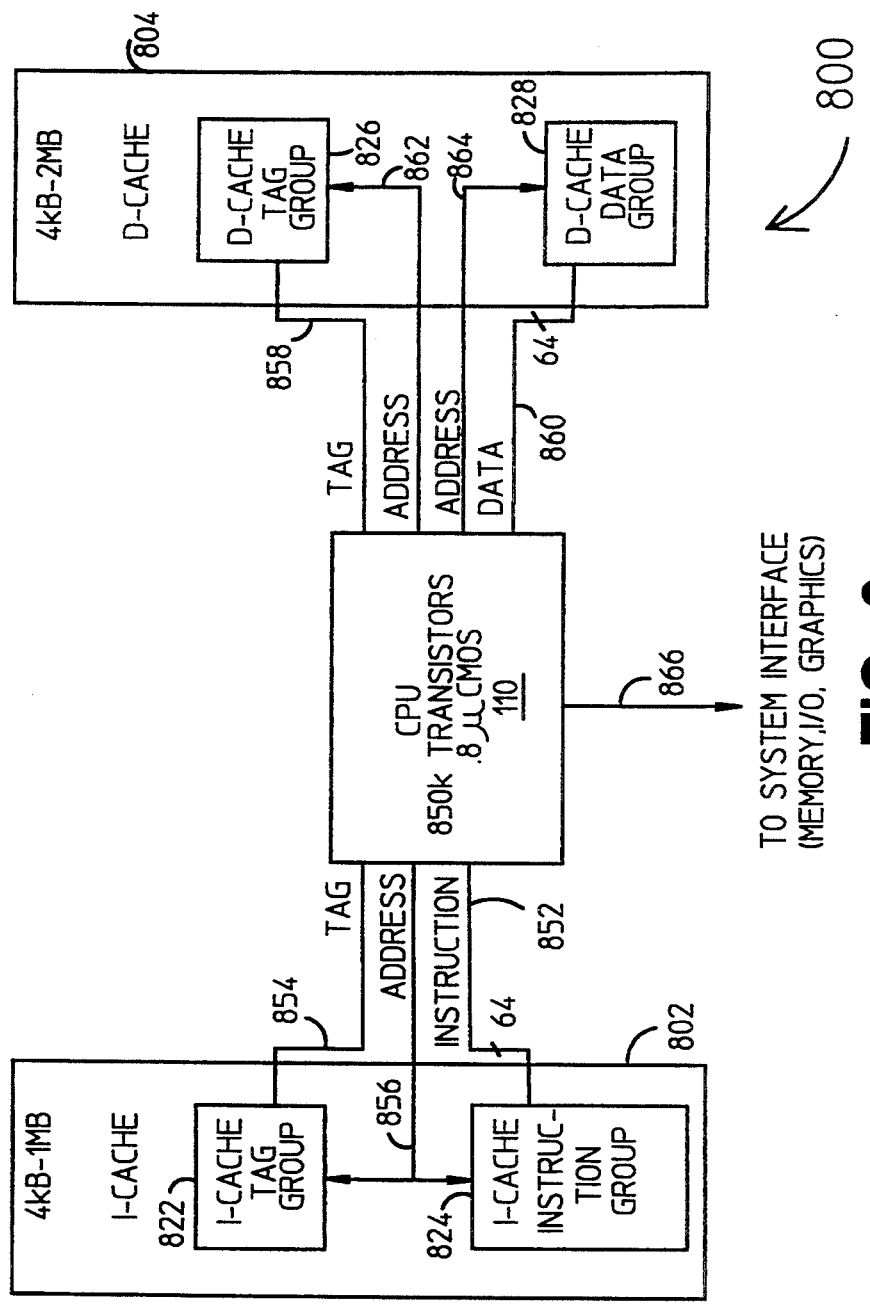
FIG. 8 is a block diagram illustrating a sample environment of the present invention.

A sample environment of the write cycle timing system and method according to the present invention is a Reduced Instruction Set Computing (RISC) processor system. FIG. 8 illustrates a RISC processor system 800 that is a sample environment of the present invention. Referring to FIG. 8, RISC processor system 800 will now be described. CPU 110 is a RISC processor with 850k transistors. CPU 110 is fabricated using 0.8 micron CMOS technology.

RISC processor system 800 includes high-speed cache memory groups 802,804. An instruction cache 802 (referred to as 'I-cache 802') is used for storing frequently recalled instructions. I-cache 802 is faster than main memory where the entire instruction set is stored. However, due to the higher cost of the I-cache (relative to main memory), systems are typically designed with an I-cache that is only large enough to hold a subset of the entire instruction set. The actual instructions chosen to reside in I-cache 802 are selected based on which instructions were most recently used. System performance is optimized when the instructions most used are stored in the limited space of the faster I-cache 802.

I-cache 802 includes a group of SRAMs called I-cache instruction group 824. For simplicity, each individual SRAM of the I-cache instruction group 824 is not shown in this figure. I-cache instruction group 824 is used to store the actual instructions. I-cache instruction group 824 interfaces to CPU 110 via an instruction bus 852. Instruction bus 852 shown in this environment is 64 bits in width. Instruction bus 852 is split out to each SRAM that makes up I-cache instruction group 824. Thus, the 64 bit instruction bus 852 in this example could be interfaced to a number of different combinations of SRAMs. For example, 64 bit instruction bus 852 could interface to eight 8-bit SRAMs, or as an alternative example, it could interface to two 16-bit SRAMs and four 8-bit SRAMs.

I-cache 802 also includes a group of SRAMs called I-cache tag group 822 for storing instruction tags. An instruction tag is used to identify the location in main memory at which a particular instruction stored in I-cache data SRAMs 824 resides. Because I-cache instruction group 824 is smaller than the amount of main memory dedicated to storing instructions, the same location in I-cache is used to store instructions from different main memory locations at different times. In other words, different locations in main memory may be aliased to the same location in I-cache instruction group 824 at different times. Consequently, instructions must be tagged with instruction tags so their origin in main memory can be determined. Instruction tags contain extra address information necessary to determine the location in main memory at which an instruction resides.

Instruction tags are sent to I-cache tag group 822 via an I-tag bus 854. An I-cache address bus 856 interfaces to all SRAMs of I-cache tag group 822 and I-cache data group 824.

RISC processor system 800 also includes high-speed data cache 804 (referred to as 'D-cache 804'). Similar to I-cache 802, D-cache 804 is used for storing most recently used data.

D-cache 804 is similarly divided into a D-cache tag group 826 and a D-cache data group 828. The purpose, structure and function of these groups 826,828 are similar to that of I-cache groups 822,824. A data tag bus 858 is included to transfer data tags between CPU 110 and D-cache tag group 826. A 64-bit data bus 860 is used to transfer data between CPU 110 and D-cache data group 828. As with instruction data bus 852, 64-bit data bus 860 is split out to each SRAM that makes up D-cache data group 828.

In this sample environment, separate address busses 862,864 are used to address D-cache tag group 826 and D-cache data group 828.

RISC processor system 800 includes standard memory, system I/O, and other peripherals, all of which are interfaced via a system interface 866.

Figure 11:
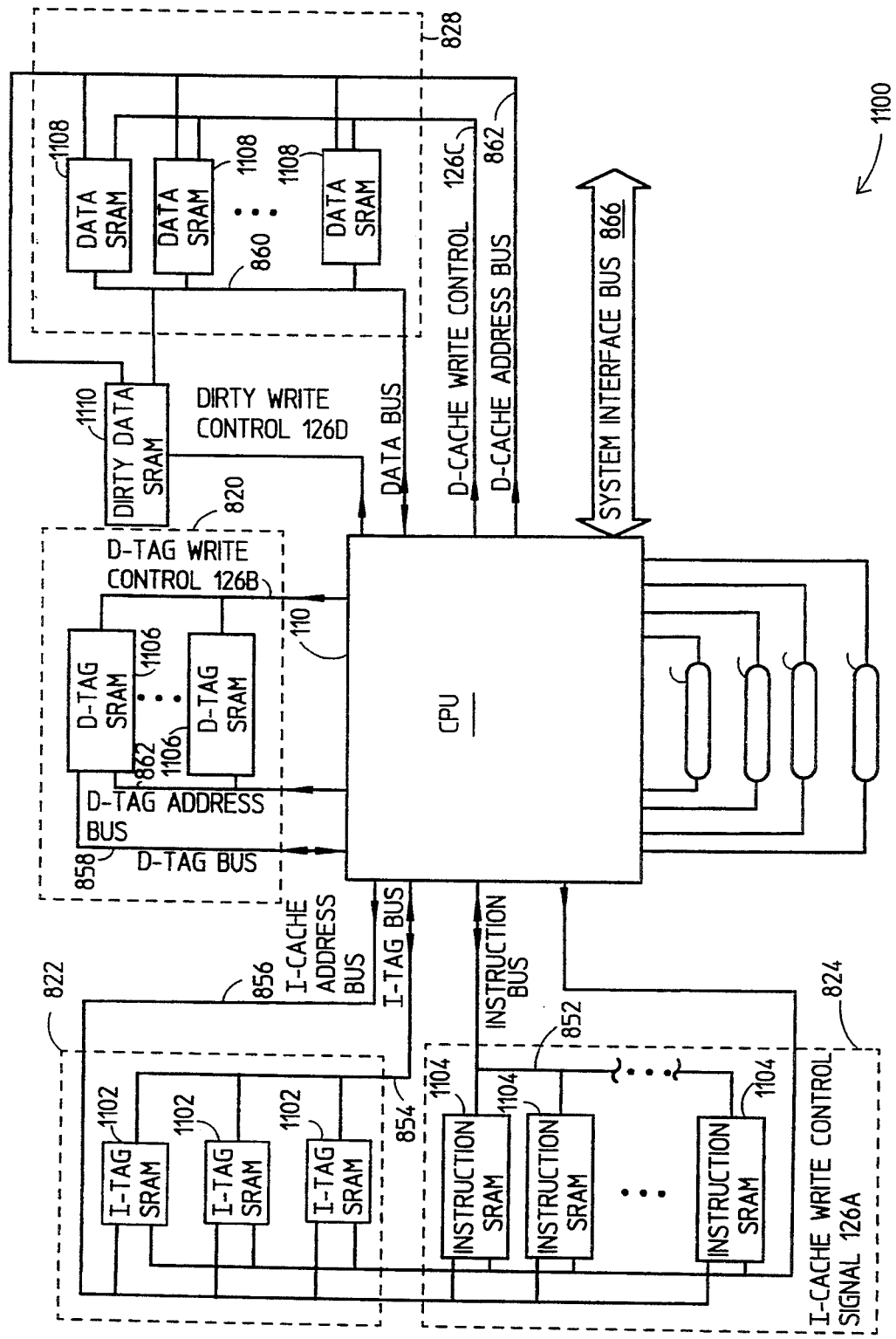
FIG. 11 is a block diagram illustrating the implementation of cache memory groups using multiple SRAM chips.

Referring still to FIG. 8, cache memories are typically implemented in groups. RISC processor system 800 is shown with four cache groups, 822, 824, 826, and 828. FIG. 11 is a block diagram illustrating the implementation of cache memory groups using multiple SRAM chips. Referring to FIG. 11, I-cache tag group 822 comprises three I-tag SRAM chips 1102. Each I-tag SRAM 1102 is interfaced to CPU 110 by I-tag bus 854, instruction bus 852, and I-cache write control signal 126A.

I-cache instruction group 824 comprises a multiplicity of instruction SRAMs 1104. Instruction SRAMs 1104 are interfaced to CPU 110 by instruction bus 852 I-cache address bus 856 and I-cache write control signal 126A.

D-cache tag group 826 and D-cache data group 828 are implemented in a similar fashion. D-cache tag group 826 comprises multiple D-tag SRAMs 1106. D-tag SRAMs 1106 are interfaced to CPU 110 by D-tag bus 858, D-tag address bus 862 and D-tag write control signal 126B.

D-cache data group 828 is implemented using a multiplicity of data SRAMs 1108. Data SRAMs 1108 are interfaced to CPU 110 by data bus 860, D-cache write control signal 126C and D-cache address bus 862.

A dirty data SRAM 1110 is also provided. Dirty data SRAM 1110 is connected to CPU 110 by data bus 860, D-cache address bus 862 and a dirty write control signal 126D. Data stored in dirty data SRAM indicates whether a particular memory location has been rewritten or updated. If the data has not been updated, it does not have to be written back to main memory.

The system interface 866 provides interfaces to memory, I/O, peripherals and graphics.

While a sample environment has been described in this subsection as RISC processor system 800, the system and method according to the present invention is not limited to this environment. The present invention is suited to implementation in a multiplicity of alternative processor/memory system environments. In addition, different groupings of cache memory SRAMs may be contemplated.

4. The Apparatus According to an Embodiment of the Present Invention

FIG. 1 is a block diagram illustrating an apparatus for improved write cycle timing according to an embodiment of the present invention. The various components utilized in implementation of this embodiment will now be described with reference to FIG. 1. Referring to FIG. 1, a key component of the present invention is delay elements 142,144. Delay elements 142,144 are used for providing delayed clock signals necessary for memory write timing according to the present invention. A first delay element 142 delays a first clock signal 132 (referred to as 'CLK1 132') to create an end-write clock 136. A second delay element 144 delays CLK2 134 to create a drive clock 138. In a preferred embodiment, delay elements 142,144 are implemented as printed circuit (PC) traces of a chosen length, where the length is selected to provide the desired amount of delay. Delay elements 142,144 provide a precise amount of delay. Alternative embodiments may be contemplated using alternative delay elements including discrete delay components. However, these alternatives require additional components and do not provide as precise an amount of delay as a PC trace delay line. Therefore, they are not as ideal as the PC traces. Additionally, phase-locked loops are sometimes used to precisely control the placement of clock signal edges.

A CPU 110 is the heart of the processor system, and controls the cache memory read and write operations. CPU 110 has a clock generator 112 that generates CLK1 132 and CLK2 134. CLK1 132 and CLK2 134 are out-of-phase clocks, and can be the logical complement of one another.

CPU 110 includes a plurality of address drivers 114A (one shown), and data drivers 114B (one shown). As an example, for a 16-bit address bus there will be 16 address drivers 114A. Similarly, for a 64 bit data bus there will be 64 data drivers 114B. Address drivers 114A and data drivers 114B are discussed in terms of a single driver for simplicity. It should be noted that the same discussion applies to all address drivers 114A on address bus 122, and all data drivers 114B data bus 124. Additionally, CPU 110 includes a CLK2 driver 114C, a CLK1 driver 114D, and a dual-edge driver 116. Dual-edge driver 116 is used for asserting and resetting a write-control signal 126.

Data to be written to the cache memory is input to data driver 114B at a data input port H. Each bit of a data word is input to a corresponding data driver 114B. Address bits indicating the address for a cache memory read or write operation are input to address drivers 114A at an address input port G.

Dual-edge driver 116 is designed to assert write-control signal 126 on a rising clock edge input at a set port A and reset write-control signal 126 on another rising clock edge present at a reset port B. In a preferred embodiment, write-enable signal 126 is low when asserted. When dual-edge driver 116 is reset, it outputs a high write enable signal. Alternative embodiments may be considered wherein the output of dual-edge driver is high when asserted and low when reset. An additional alternative embodiment may be considered wherein dual edge driver 116 is asserted and/or reset on falling clock edges input at set port A and/or reset B, respectively. Additional dual edge drivers 1.16 may be provided to control multiple groups of SRAMs 120.

As will be discussed further in this application with reference to a FIG. 11, a cache memory comprises a multiplicity of SRAM chips 120. For the purposes of the present discussion, however, the write cycle time according to the present invention will be discussed with reference to a single SRAM chip 120. SRAM 120 has address ports C (one shown) at which address signals are received via address bus 122. SRAM 120 also has data ports D (one shown) to which data bus 124 is connected. Data ports D can be configured to receive data by SRAM 120 receivers (not shown) for write operations, and to transmit data using SRAM 120 drivers (not shown) for read operations. The SRAM 120 drivers connected to data ports D are tri-state drivers. The SRAM 120 drivers can be 'tri-stated.' When tri-stated, the drivers are set to a high-impedance state so they don't interfere with the receivers or other data bus 124 operations. Tri-stated drivers are effectively 'turned off.'

To transition the drivers from an active transmitting state to the inactive tri-state state requires a certain amount of time. The exact amount of time required depends on the particular SRAM 120 chip chosen and may, in addition, vary among SRAMs of the same part number. As an example, an 8 ns asynchronous SRAM, part #MCM 6706A-8, manufactured by Motorola Semiconductor Products Inc., of Austin, Tex. is specified as having a transition-to-tri-state time of 4 ns.

In addition, SRAM 120 has a write control port WE at which it accepts a write-control signal 126. When write-control signal 126 is asserted, SRAM 120 is placed in a mode to receive data at its data ports D. In this mode, the SRAM 120 drivers are tri-stated and its receivers are enabled. When write-control signal 126 is reset, SRAM 120 cannot receive data at data ports D. In a preferred embodiment, write-control signal 126 is asserted when it is in a low state (low voltage level), and reset when at a high state. Alternative embodiments may be contemplated wherein write control signal 126 is true when at a high state. As is obvious to one skilled in the art, the convention chosen depends on which SRAM 120 is selected.

In actual practice, the cache memory is typically an array of several groups of SRAMs 120 as shown in FIG. 8.

5. A System and Method According to an Embodiment of the Present Invention

Figure 2:
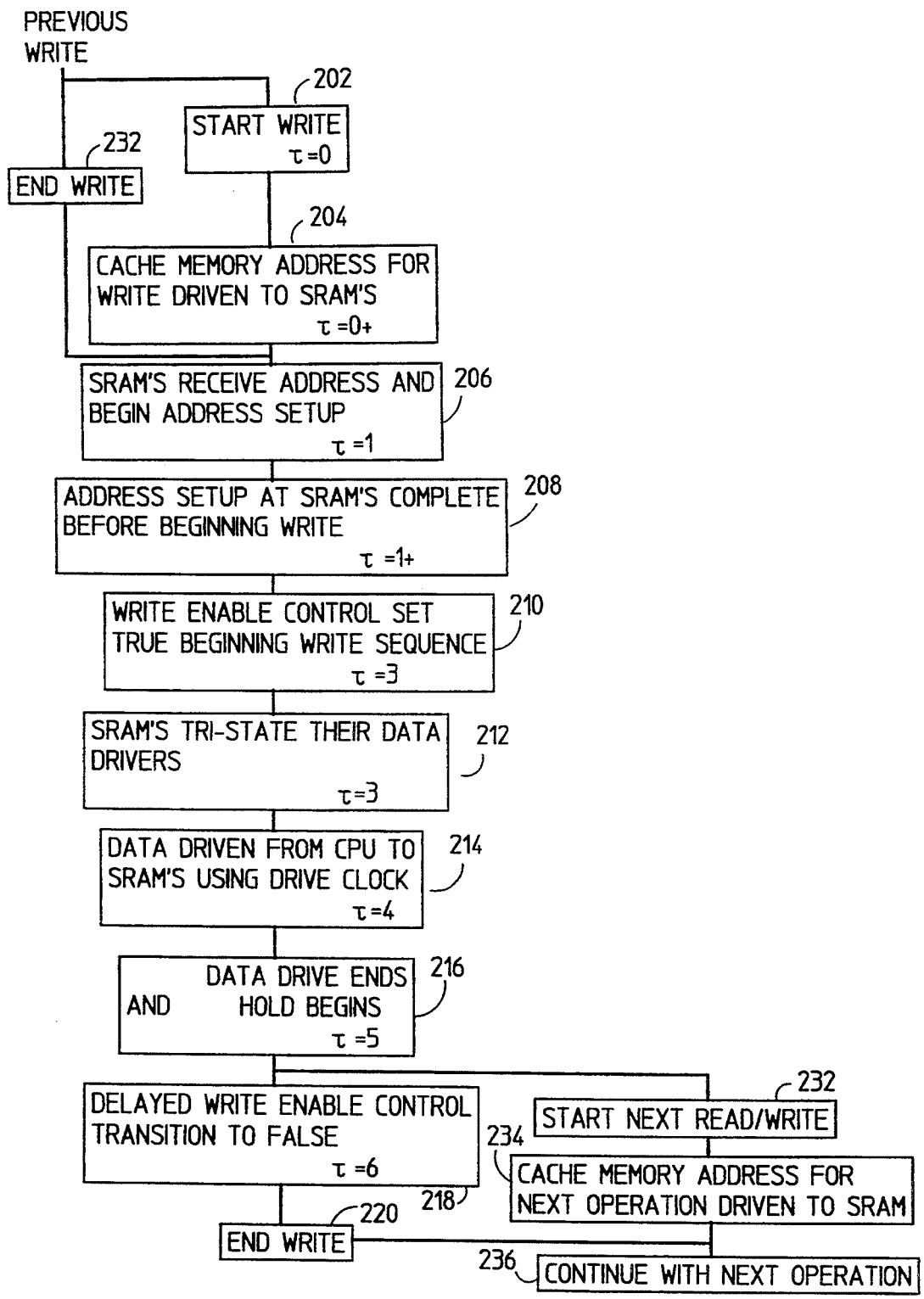
FIG. 2 is a flow diagram illustrating a cache memory write process according to the present invention.
Figure 3:
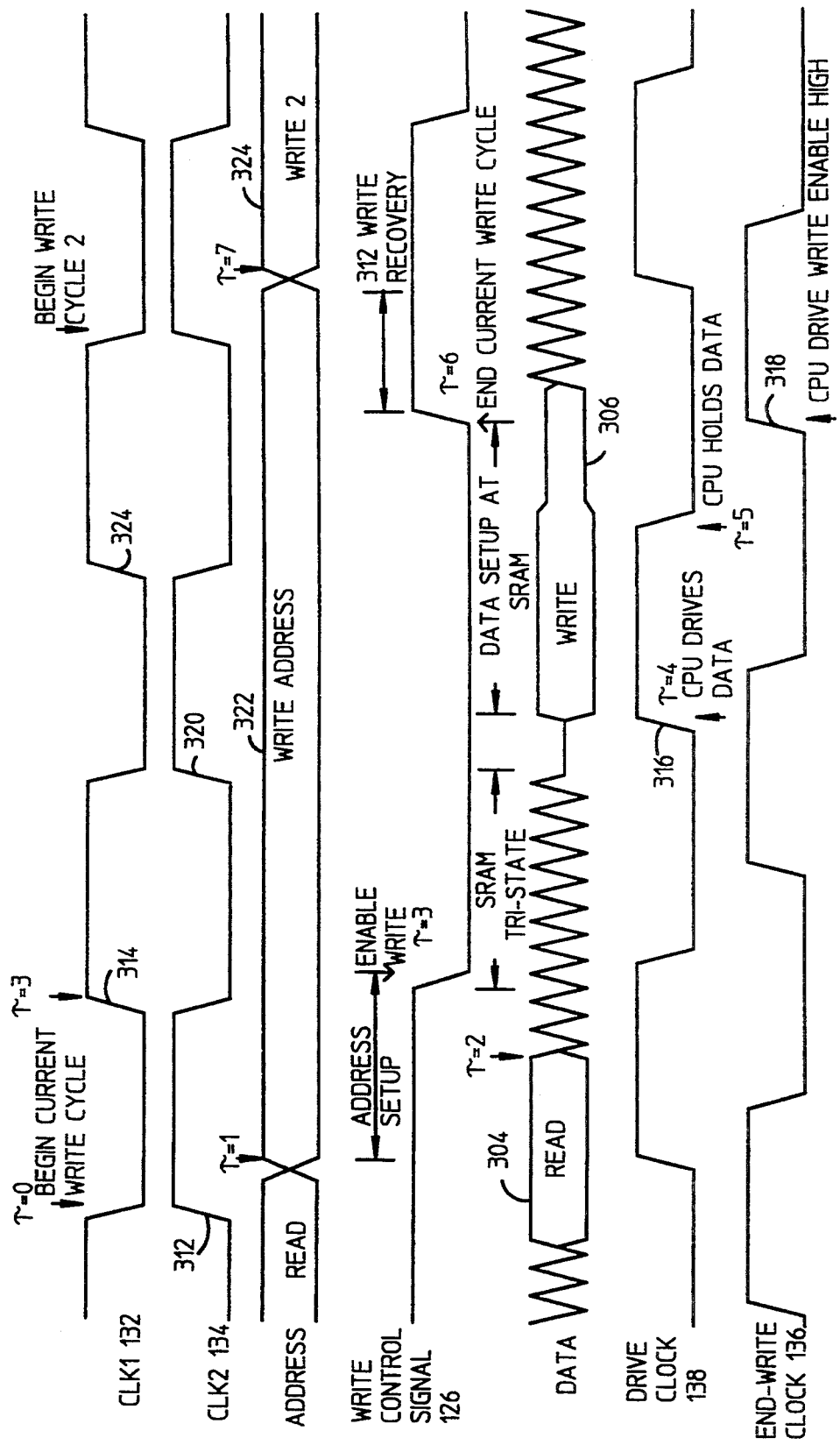
FIG. 3 is a timing diagram illustrating temporal relationships among the signals of the cache memory write process according to the present invention.

FIG. 2 is a flow chart illustrating the write cycle timing method of the present invention. FIG. 3 is a timing diagram illustrating the temporal relationships among the various signals used in the write cycle timing system and method according to the present invention. Referring to FIGS. 1, 2, and 3, the write cycle timing system and method according to a first embodiment of the present invention will now be described. For the purposes of this discussion, the write cycle sequence described will be called the current write cycle, although it is typical of any write cycle in a series of read and write cycles.

In a step 202, the current write cycle begins. The current write cycle begins coincident with a first transition 312 of CLK2 134 at time $\tau=0$.

In a step 204, at a time $\tau=0$ plus a brief internal delay, first transition 312 of CLK2 134 strobes address driver 114A at a timing input F to send a write address 322 for the current write cycle to SRAM 120. At this time, write address 322 is driven onto address bus 122.

Note, the current write cycle may commence before a previous write cycle has ended as indicated in a step 232. However, a cache memory write address 322 for the current write cycle cannot be received by SRAM 120 until after the previous write has ended in step 232. If write address 322 for the current write cycle is received by SRAM 120 before the previous write has ended, a write error may occur. The resultant write error may be SRAM 120 writing data from the previous write operation to the wrong address, or the previous write operation may be uncompleted because the previous write address was not valid for a sufficient amount of time.

In a step 206, at a time $\tau=1$, write address 322 arrives at SRAM 120. The time between $\tau=0$ and $\tau=1$ is the propagation delay time associated with the transmission of the address across address bus 122.

In a step 208, at a time $\tau=1+$, write address 322, is received and recognized by SRAM 120, thus meeting SRAM 120 setup specifications. According to the embodiment described herein, the address setup does not have to be completed until a time $\tau=3$, however, most SRAMs specify setup times much shorter than the time allotted in this embodiment.

In a step 210, at time $\tau=3$, a positive transition 314 of CLK1 132 triggers dual-edge driver 116 at input port A, causing write-control signal 126 to be asserted. Since positive transition 314 is the first positive transition of CLK1 132 for the current write cycle, it can be referred to as 'first transition 314.'

First transition 314 of CLK1 132 is used in this embodiment to assert write-control signal 126. Thus, the temporal position (phase) of CLK1 132 governs the time at which write-control signal 126 is asserted. The temporal position of first transition 314 is selected to occur as soon as possible for optimum performance. However, the earliest time at which write-control signal 126 can be asserted (i.e. the earliest first transition 314 can occur), is constrained by at least one of two factors.

A first factor is that write-control signal 126 cannot be asserted until write address 322 has been valid at address ports C for a sufficient amount of time to meet the address set-up time as specified for SRAM 120. Set-up time is the amount of time required before an address at address ports C is recognized at SRAM 120. Thus, data cannot be written to SRAM 120 at the specified address until address 322 is valid for the specified set-up time.

This first factor exists for all environments. However, in many SRAM 120 chips, the address set-up time required is very short or even zero. In the SRAM 120 chip chosen in the preferred embodiment, the set-up time is specified as zero.

Also to be considered when considering the first factor is the propagation delay time associated with transmitting the address across address bus 122. There are uncertainties in this propagation delay time which must also be considered.

The second factor in selecting the temporal position of first transition 314 is the time at which data 304 from a previous read operation is no longer required to remain valid on data bus 124. Write-control signal 126 cannot be asserted until data 304 from a previous read operation is no longer needed on data bus 124 for that operation. In numerous applications, this factor is not a consideration because a previous read operation is typically complete before the current write operation begins. However, in in some applications, this may not be the case and data 304 may need to remain valid until a time $\tau=2$. In these applications, if write-control signal 126 is asserted before time $\tau=2$, SRAM 120 data drivers will tri-state, resulting in the premature removal of data 304 from data bus 124.

In a step 212, also at a time $\tau=3$, write-control signal 126, asserted at first transition 314 of CLKI 132, causes SRAM 120 to tri-state its data drivers, putting them into a high-impedance mode so they do not affect the data bus. The amount of time required for SRAM 120 data drivers to tri-state is specified in SRAM 120 chip specifications.

In a step 214, at a time $\tau=4$, data 306 to be written to SRAM 120 is driven from CPU 110 over data bus 124. Data driver 114B, which drives data 306 to be written, is controlled in time by a positive transition 316 (referred to as 'begin-drive edge 316') of drive clock 138. Drive clock 138 is input to data driver 114B at a timing input port E. When positive transition 316 occurs, data driver 114B transmits data 306 over data bus 124.

There are temporal considerations constraining when data 306 can be driven over data bus 124. Data 306 should be driven over data bus 124 as soon as possible to minimize the time required to perform the write operation. However, data 306 can not be driven over data bus 124 by data driver 114B until SRAM 120 has tri-stated its drivers. Therefore, temporal positioning of begin-drive edge 316 of drive clock 138 is important. To place begin-drive edge 316 at the optimum time, drive clock 138 is generated by delaying CLK2 134 through delay element 144. The amount of delay introduced by delay element 144 is chosen such that begin-drive edge 316 of drive clock 138 occurs soon after the SRAM 120 drivers are tri-stated. To allow for uncertainties in the time at which write-control signal 126 is asserted, and in the tri-state time, additional delay time is added to delay element 144.

Note, as discussed with respect to steps 210 and 212, first transition 314 of CLK1 132 causes write control signal 126 to be asserted and SRAM 120 drivers to tri-state. The earlier that first transition 314 of CLK1 132 occurs, the earlier the drivers will tri-state, and therefore, the earlier begin drive edge 316 can occur. Thus, the amount of delay introduced by delay element 144 to properly position begin-drive edge 316 is based on the phase difference between CLK2 134 and CLK1 132 (i.e., the time difference between first transition 312 of CLK2 134 and first transition 314 of CLK1 132) and the tri-state time.

As an example, consider a 100 Mhz system with a 10 nanosecond (ns) clock period. The write cycle begins on the first rising edge of CLK2 134 at time $\tau=0$. 5 ns later at time $\tau=3$ write-control signal 126 is asserted. The tri-state time of SRAM 120 in this example is also on the order of 5 ns. Therefore, the minimum time that must pass before data can be driven to SRAM 120 is 10 ns. The second rising edge of CLK2 134 occurs 10 ns after the first, however, this edge cannot be used to begin driving the data because of timing uncertainties in the assertion of write-control signal 126 and in the tri-state time. Therefore, a margin of safety is provided by delaying CLK2 134 to create drive clock 138, and using begin-drive edge 316 of drive clock 138 to drive data 306 onto data bus 124.

Now that data 306 is driven to SRAM 120, data 306 must remain valid on data bus 124 long enough to meet a data set-up time at SRAM 120. Data set-up time is the amount of time that data must remain valid on data bus 124 to be written to SRAM 120. The amount of time required is determined by the set-up specifications of the particular SRAM 120 chip used. The setup time for a 10 ns SRAM is typically on the order of 5 ns. The set-up time will vary depending on the particular SRAM chip used.

In a step 216, at a time $\tau=5$, the data drive begun in step 214 ends and a data hold begins. The data hold maintains data 306 on data bus 124 for the data set-up time (i.e. long enough to be written to SRAM 120). In the data drive in step 214, data was driven across data bus 124 using field effect transistors (FET) capable of driving a sufficient amount of current to switch the data bus. In the data hold step 216, the data driven on data bus 124 is held valid using a hold circuit comprising relatively small FETs. A pair of FETs in a pull-up/pull-down configuration is interfaced to each output driver 114B to hold the data at the output of the integrated circuit. Each pair of FETs is called a hold circuit because it essentially keeps the data present at an output. The hold circuit does not provide enough current to switch the outputs. It only provides enough current to maintain present data levels.

When new data is driven by CPU 110, the drive FETs switch the output signals. The hold circuit then maintains this signal on the bus during the data hold period. The hold circuit essentially follows the output. The higher current drive FETs can easily overdrive the hold circuit, thus switching the output. The hold circuit then holds the new value. An advantage of holding data on data bus 124 using keeper FETs is that chip enable and output enable signals are not required. This is because the high current FETs that originally drive data on to data bus 124 in step 214 are turned off and only the keeper FETs hold the data. New data can be driven on to data bus 124 by either CPU 110 or by SRAM 120 without turning off the hold circuit FETs. Since the drive FETs have already been turned off, situations where SRAM 120 drivers are fighting CPU 110 drivers will never arise.

In a step 218, at a time $\tau=6$, write-control signal 126 transitions to a logic high (resets) thus ending the current write operation. The timing of this reset is controlled by a positive transition 318 (referred to as 'end-write edge 318') of end-write clock 136 at a timing input port B of dual-edged driver 116B. End-write clock 136 is generated by delaying CLK1 132 through delay element 142. The position in time of end-write edge 318 is controlled by the amount of delay introduced by delay element 142. Data 306 must be held on data bus 124 long enough to meet the data set-up time as specified for the particular SRAM used. Thus, end-write edge 318 cannot occur until after this time.

In other words, end write edge 318 most occur at least Y ns after the data drive was begun at begin drive edge 316, where Y ns is the specified data setup time. Thus, in terms of CLK1 132 and CLK2 134, the amount of delay introduced by delay element 142 should be Y ns plus the amount of delay introduced by delay element 144 less the phase difference between CLK2 134 and CLK1 132. Also, additional time is added to account for uncertainties in temporal placement of the edges and in propagation delay time of data 306 across data bus 124.

In FIG. 3, the end of the current write cycle is shown as completed at time $\tau=6$ before an address 324 is sent to SRAM 120 for the next operation, thus allowing a write recovery time 312. Many SRAM 120 chips do not require a write recovery time 312. Where no write recovery time 312 is required, write-control signal 126 may remain asserted, and thus the write operation may continue until the next address is received by SRAM 120 at a time $\tau=7$. Alternatively, the clock cycle time can be shortened so the next operation begins sooner.

As shown in FIG. 2, a step 232 for beginning the next operation, and a step 234 for driving the next address to SRAM 120 may actually occur before the current write cycle is completed in a step 220. In this case, in a step 234, an address 324 for the next operation is driven to SRAM 120. Write-control signal 126 resets prior to receipt of address 324 by SRAM 120 for the next operation. In a step 236, the next operation is continued.

Figure 9:
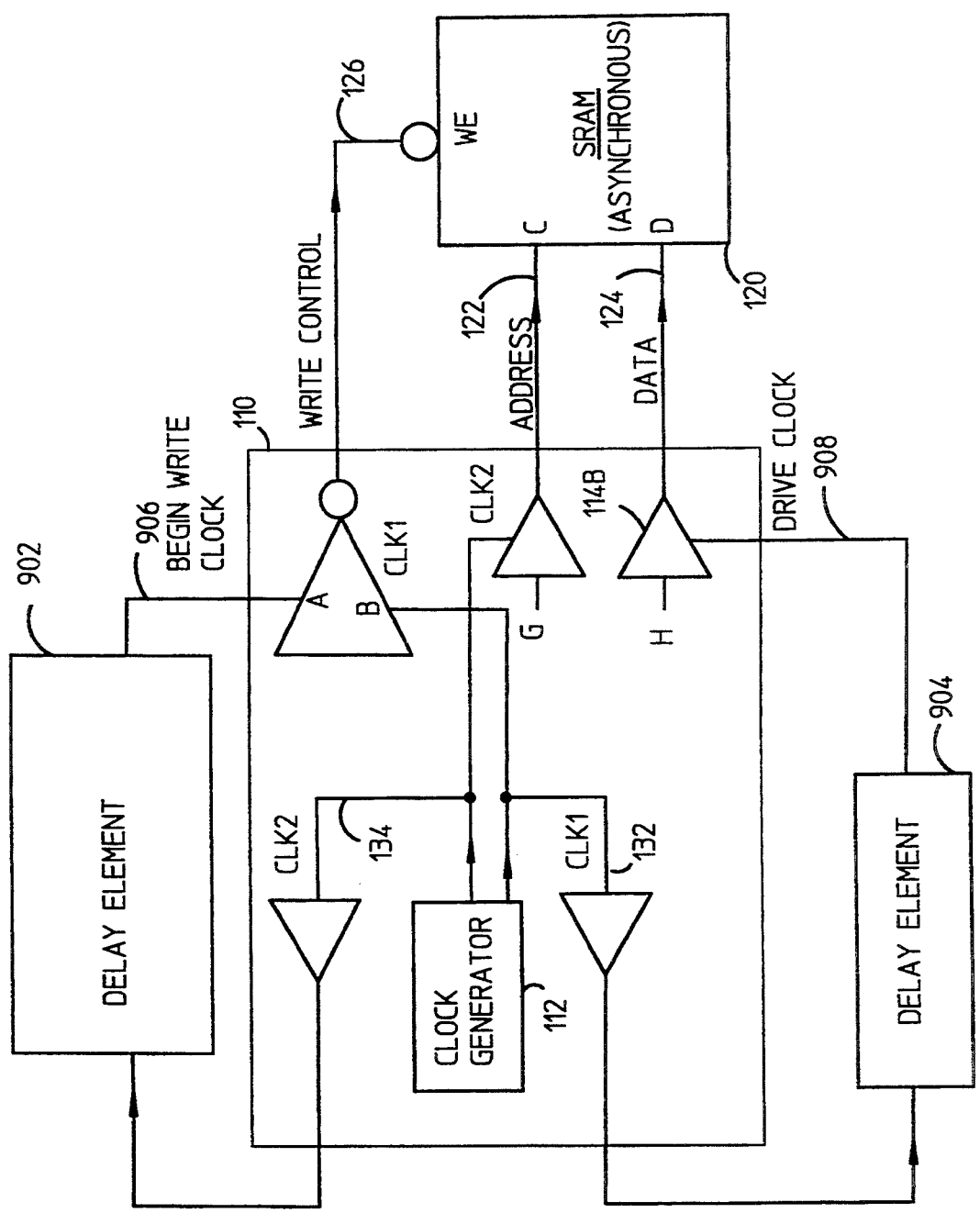
FIG. 9 is a block diagram illustrating an alternative embodiment of the present invention for SRAM chips with a very short address set-up time.
Figure 10:
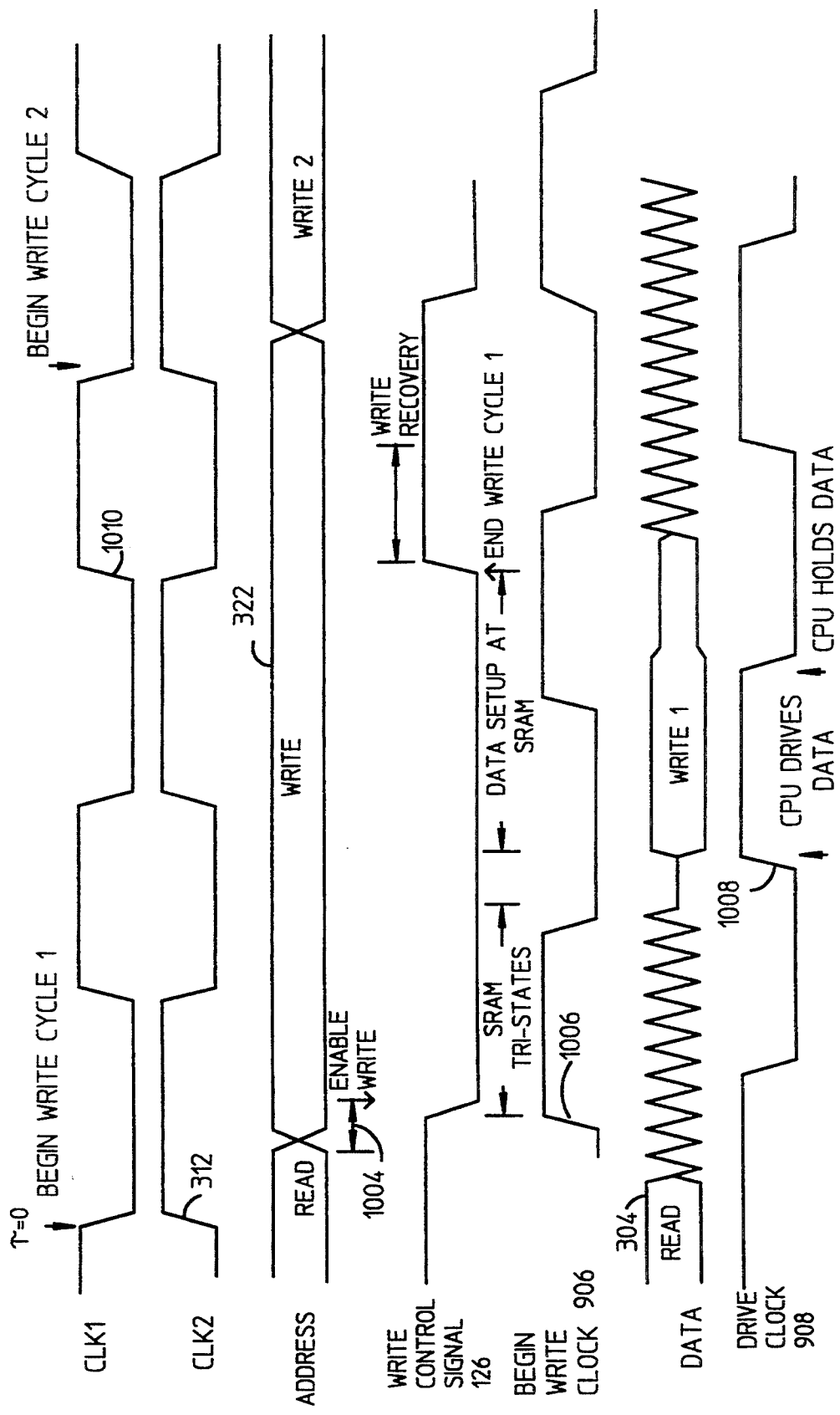
FIG. 10 is a timing diagram illustrating the temporal relationship among the signals of the embodiment illustrated in FIG. 9.

6. An Emodiment of the Present Invention for SRAMs With A Very Short Address Set-Up Time In cases where SRAM 120 setup time is very short, or near 0, and data from a previous operation does not need to remain valid for very long beyond the beginning of the current write cycle, a second embodiment can be considered wherein write control signal 126 is asserted using a delayed version of CLK2 134. FIG. 9 is a block diagram illustrating this embodiment. FIG. 10 is a timing diagram illustrating the temporal relationships among the various signals of this embodiment. Referring to FIGS. 9 and 10, this embodiment will now be described. Clock generator 112 generates out of phase clock signals CLK1 132 and CLK2 134. As in the embodiment described above, a first transition 312 of CLK2 134 begins the current write cycle at a time $\tau=0$. In this second embodiment, however, an address setup time 1004 is very short or 0. Because address setup time 1004 is much shorter than in the previous embodiment, write control signal 126 can be asserted at an earlier time. Note however, that write control signal 126 still cannot be asserted before read data 304 from a previous read operation is no longer required to be held on data bus 124.

Since write control signal 126 can be asserted at an earlier time than was possible in the previous embodiment, a first transition 1006 of a begin-write clock 906 is used. Begin write clock 906 is created by delaying CLK2 134 through a delay element 902. The amount of delay introduced by delay element 902 depends on the address setup time as specified for the particular SRAM 120 and, in some environments, the previous read operation.

Data is driven to SRAM 120 by data driver 114B at a time marked by a begin-drive edge 1008. Begin-drive edge 1008 is timed to occur immediately after SRAM 120 has tri-stated its drivers. Drive clock 908 is created by delaying CLK1 132 through a delay element 904.

The amount of delay introduced in delay element 904 is determined by using the SRAM 120 tri-state time, plus the amount of delay introduced by delay element 902, less the phase difference between CLK2 134 and CLK1 132. Additional time may be added to account for uncertainties in edge placement.

In this embodiment, the write cycle is ended by resetting right control signal 126 using an end write edge 1010 of CLK1 132. This end write edge 1010 is a second positive transition of CLK1 132. This embodiment functions particularly well when CLK1 132 and CLK2 134 are the complement of each other. If, on the other hand, CLK1 132 is skewed so that end write edge 1010 occurs earlier (than if CLK1 132 and CLK2 134 are complementary), end write edge 1010 may occur too soon. This will depend on the data setup time specified for the particular SRAM chosen and the amount of propagation delay in data bus 124.

Note that this embodiment allows additional time for write recovery, if needed. Alternatively, it may allow additional time for the SRAM to tri-state its data drivers or for data setup at SRAM 120, depending on the skew of CLK1 132.

Figure 12:
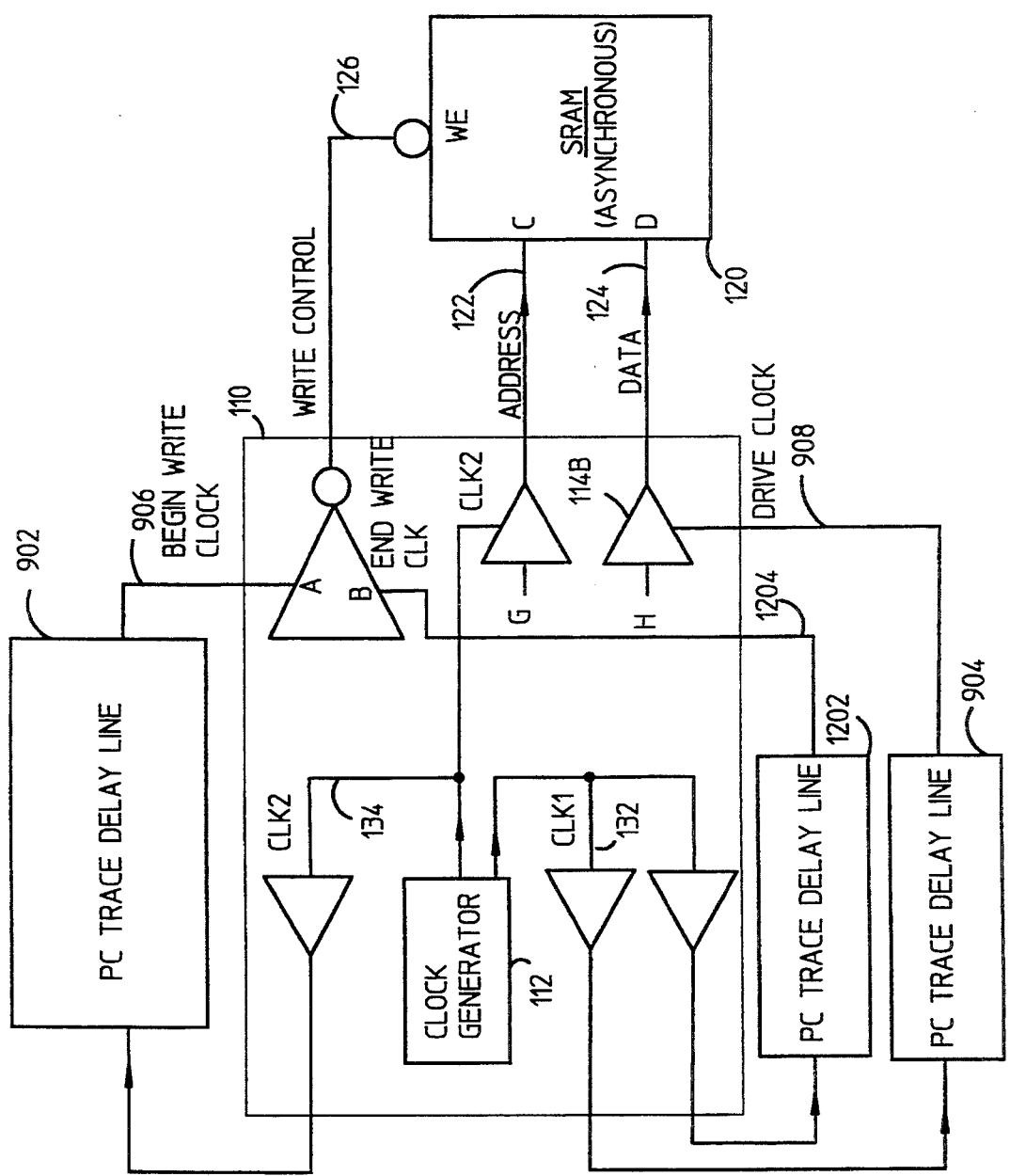
FIG. 12 is a block diagram illustrating an embodiment of the present invention having three delay elements.

7. An Alternative Embodiment Of the Present Invention Using Three Delay Elements An additional alternative embodiment can be considered using three delay elements. In this embodiment, a delay element is used to generate begin write clock, drive clock, and end write clock. This embodiment provides the system with an additional flexibility of being able to control the placement of three clock edges. FIG. 12 illustrates an alternative embodiment of the present invention using three delay elements. Note that FIG. 12 is identical to FIG. 9, with the addition of a delay element 1202 to generate end write clock signal 1204.

End write clock signal 1204 has an end write clock edge used to control the time at which write control signal 126 is reset to a high state. Since end write clock 1204 is provided using a delay element 1202, placement of end write edge 1206 can be selected to occur at the optimum point in time. For example, the frequency of CLK2 134 and CLK1 132 may be increased to provide a faster processor cycle time than in the other embodiments described herein. This is accomplished because this embodiment allows optimization for each of the SRAM specifications.

8. An Alternative Embodiment of the Present Invention Using One Original Clock Signal The two embodiments as described above, with reference to FIGS. 1, 2, 3, 9, 10, and 12 were discussed in terms of two clock signals CLK1 132 and CLK2 134.

Figure 4:
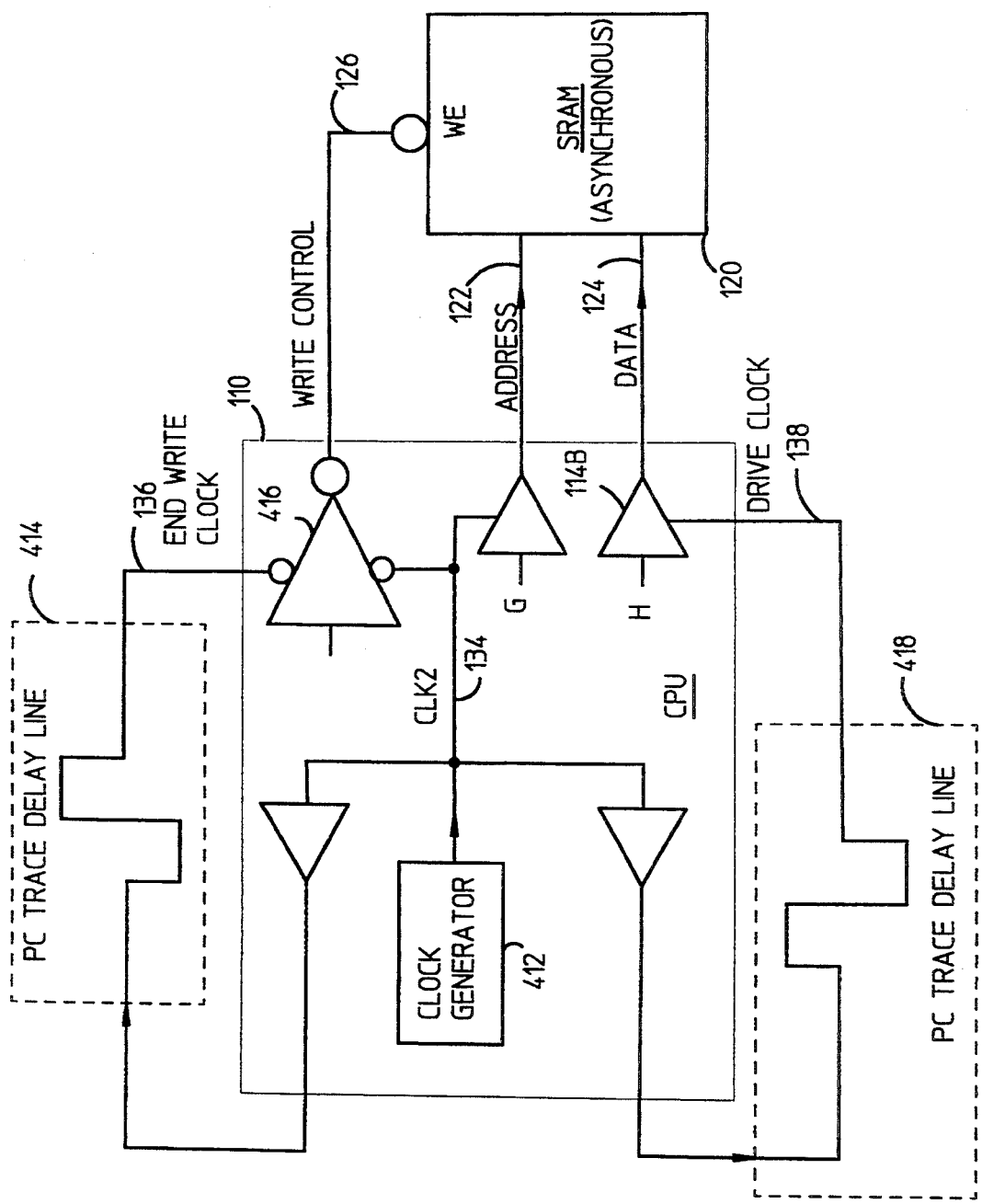
FIG. 4 is a block diagram illustrating a cache memory write system using a single clock signal.
Figure 5:
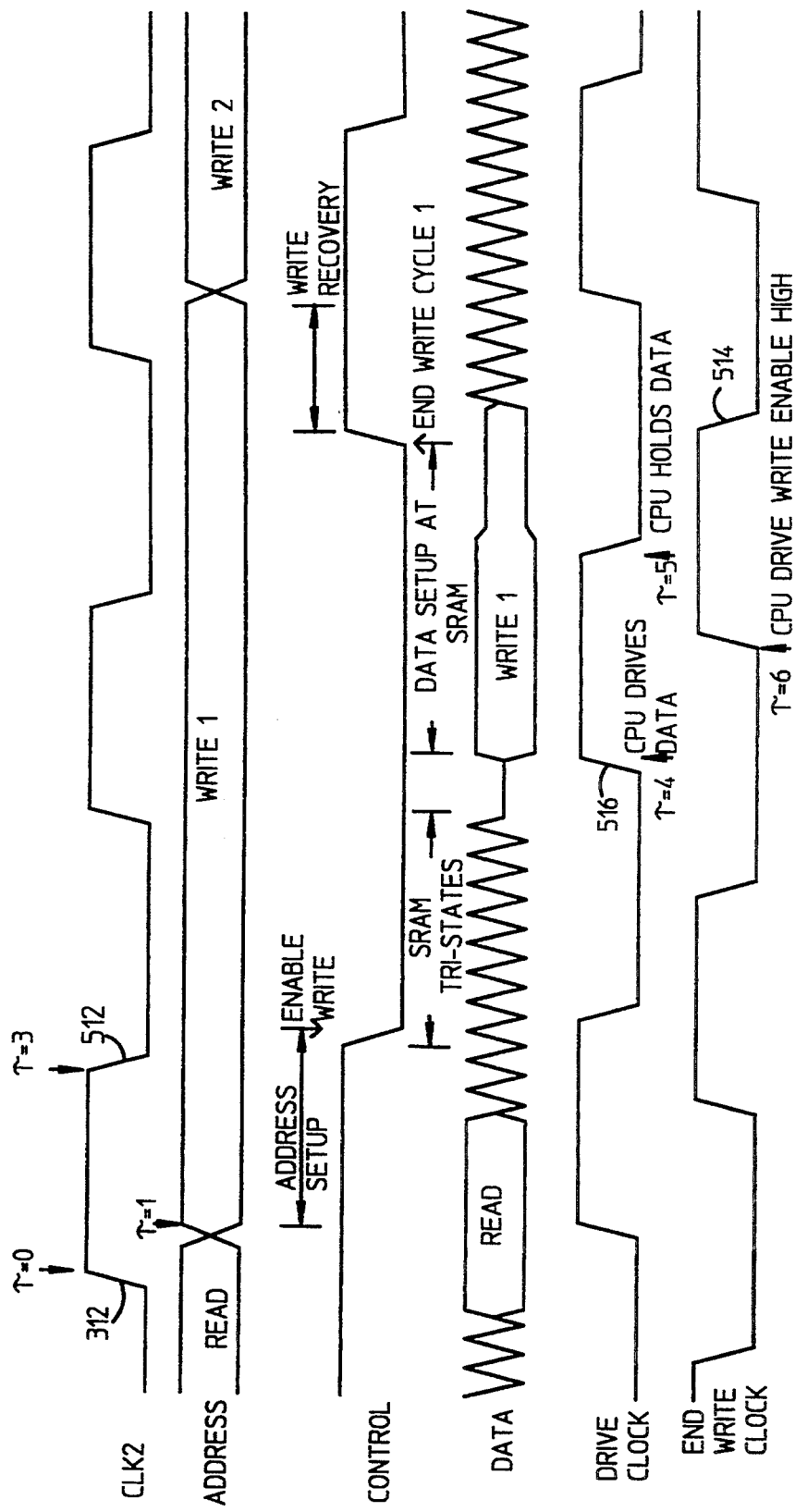
FIG. 5 is a timing diagram illustrating temporal relationships among signals of a cache memory write system using a single clock signal.

An additional alternative can be considered wherein only clock signal CLK2 134 is used. FIG. 4 is a block diagram illustrating an alternative embodiment according to the present invention using a single clock signal and delayed variants thereof to control write cycle timing. FIG. 5 is a timing diagram illustrating the relationships among the single dock signal, its delayed variants, and the write cycle operations. Referring to FIGS. 4 and 5, this alternative embodiment will now be described. A clock generator 412 generates a clock signal CLK2 134. CLK2 134 is delayed through a first delay element 414 to generate end-write clock 136. CLK2 134 is also delayed through a second delay element 418 to generate drive clock 138.

A first transition 312 of CLK2 134 begins the write cycle at a time $\tau=0$. At a time $\tau=1$, the write address is driven to SRAM 120 over address bus 122. At a time $\tau=3$, a negative transition 512 of CLK2 134 triggers dual edge driver 416 to assert write-enable signal 126. A first cycle of CLK2 134 of the current write operation is defined as the first cycle of CLK2 134. Transition 512 occurs in the middle of the first cycle of CLK2 134.

At a time $\tau=4$, a begin-drive edge 516 of drive clock 138 causes data driver 114B to drive the data over data bus 124 to SRAM 120. At a time $\tau=5$, the data is held on data bus 124 to meet the SRAM setup specifications. At a time $\tau=6$, a negative transition 514 of end-write clock 136 triggers dual edge driver 416, causing write-control signal 126 to reset. This marks the end of the write cycle.

Note, by adjusting the amount of delay introduced by delay elements 414, 418 or delay elements 142, 144 write enable timing according to the present invention can be customized to provide optimum performance according to timing specifications of the SRAM chip used in the system.

9. An Embodiment Using Sequencing Logic to Control Write Cycle Timing

FIGS. 1, 4, 9, and 12 are drawn to show the various clock signals directly controlling the drivers of the present invention. This depiction was chosen to best illustrate which signals are responsible for timing the critical portions of the write cycle. In actual implementation additional logic is implemented to control which edge of end-write clock 136 resets write-control signal 126, and to control which edge of drive clock 138 times driving data onto data bus 124.

Figure 6:
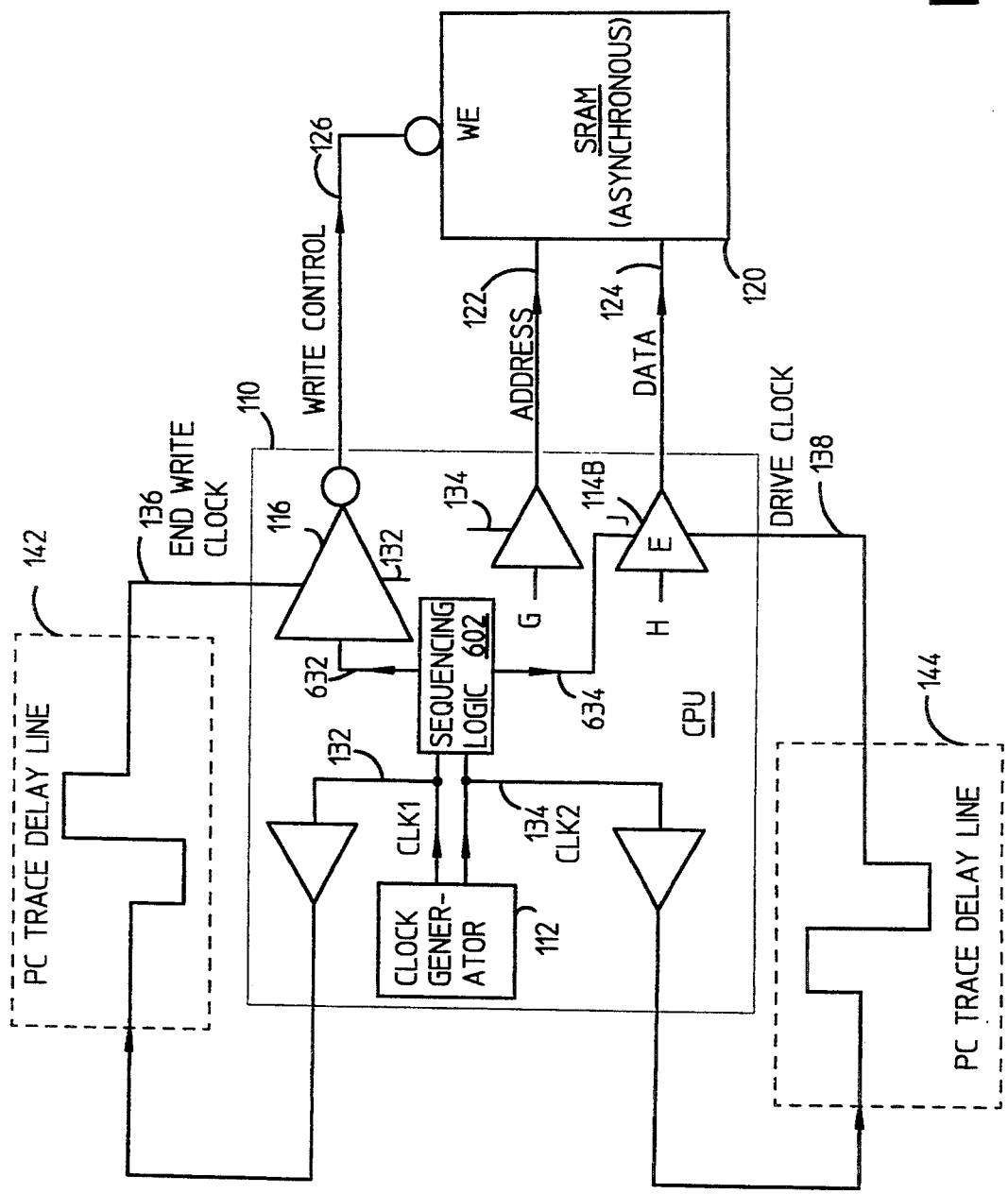
FIG. 6 is a block diagram illustrating control logic used to select a proper edge of a drive clock and an end-write clock according to the present invention.
Figure 7:
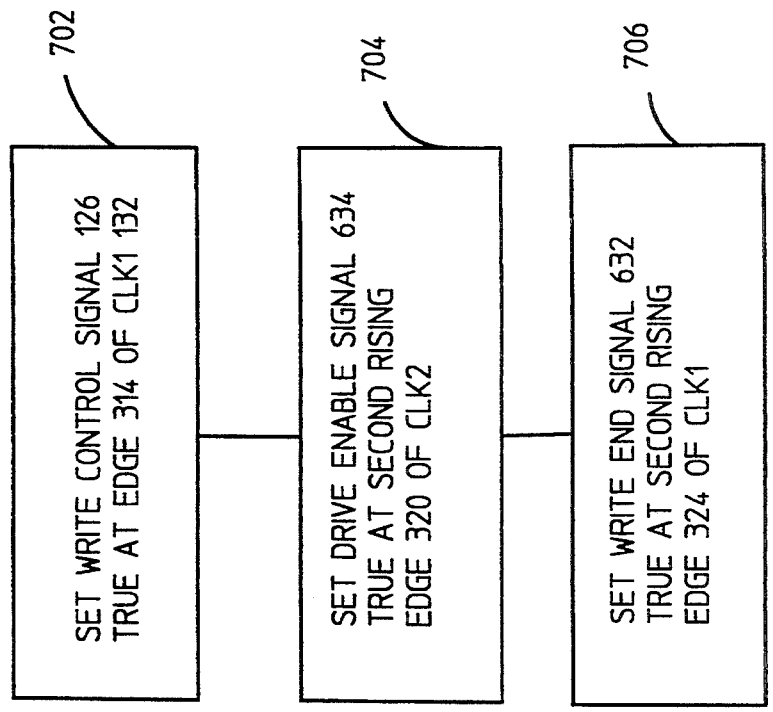
FIG. 7 is a flow chart illustrating a method of selecting the proper edge of a drive clock and an end-write clock according to the present invention.

FIG. 6 illustrates sequencing logic 602 used to select the proper edge of drive clock 138 and write enable clock 136 according to the present invention. A clock generator 112 is used to generate clock signals CLK1 132 and CLK2 134. FIG. 7 is a flow chart illustrating the method of selecting the proper edges of drive clock 138 and end-write clock 136. Referring to FIGS. 3, 6, and 7, selection of the proper drive clock 138 and end write clock 136 edges will now be described. In a step 702, write-control signal 126 is asserted at the first transition 314 of CLK1 132. Dual-edge driver 116 asserts write-control signal 126 at first transition 314 of CLK1 132 when the processor cache memory system is performing a cache write operation.

In a step 704, a drive enable signal 634 is asserted (logic high) at the second rising edge 320 of CLK2 134. The transitions of drive clock 138 will trigger data driver 114B at timing input port E only when drive enable signal 634 is asserted at an enable input port J. Thus, using drive enable signal 634, the sequence can be controlled such that data will not be driven to SRAM 120 until the proper edge, begin-drive edge 316, of drive clock 138. Use of drive enable signal 634 prevents the data drive from occurring at other edges of drive clock 138.

A data hold holds data on data bus 124 with a hold circuit as described above.

Data driver 114B as discussed here with enable input port J is functionally equivalent to a standard driver 114B with one timing input port E and an AND gate. Drive enable signal 634 and drive clock 138 would be input to the AND gate. The AND gate would output the positive transitions of drive clock 138 to timing input port E only when drive enable signal 634 is high.

In a step 706, a write end signal 632 is asserted at a second rising edge 324 of CLKI 132. Dual-edge driver 116 will not set write-control signal 126 false on a rising edge of end-write clock 136 unless write end signal 632 is asserted. Thus, end write signal 632 is used to control selection of the edge of end write clock 136 used to end the write operation by resetting write-control signal 126.

Although this implementation was described in terms of the first embodiment, it will be apparent to one of ordinary skill in the art how to apply this implementation to alternative embodiments.

10. Controlling Multiple Groups of SRAMs

Multiple groups of SRAMs can be controlled according to the write timing system and method of the present invention. In implementations using multiple groups of SRAMs, a single write control signal 126 is needed to control write operations for each group.

Referring again to FIGS. 3 and 11, a sample implementation 1100 comprises five groups of SRAMs. I-cache tag group 822, I-cache instruction group 824, D-cache tag group 826, D-cache data group 828, and dirty data SRAM 1110. Each group may have its own write control signal 126. In sample implementation 1100, I-cache tag group 822 and I-cache instruction group 824 share I-cache write control signal 126A. Thus, sample implementation 1100 contemplates four individual write control signals 126. If sample implementation 1100 was implemented using conventional systems with three control signals for write operations, twelve separate control signals would be necessary as opposed to four. Thus, the present invention saves valuable I/O space on CPU 110. It should be noted that additional I/O pins are required to interface to the delay elements.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The embodiments were described above in specific terms of positive transitions or negative transitions triggering certain events. Alternative embodiments can be contemplated using various implementations of positive and/or negative transitions. These alternative embodiments will be obvious to one of ordinary skill in the art.

What is claimed is:

1. An apparatus for optimizing cache memory write cycle timing in a microprocessor cache memory system having an SRAM cache memory, a clock generator for generating a first out-of-phase clock signal and a second out-of-phase clock signal, and a write control signal to enable memory writes, the apparatus comprising:

(a) a first PC trace delay line having an input coupled to a first out-of-phase clock signal output of the clock generator and an output coupled to a dual edge driver;

(b) said dual edge driver having a first input coupled to the clock generator, a second input coupled to said output of said first PC trace delay line and an output coupled to a write-control port of the SRAM to provide the write control signal to the SRAM;

(c) a second PC trace delay line having an input coupled to a second out-of-phase clock signal output of the clock generator, and an output coupled to a data driver to provide a drive clock signal to said data driver;

(d) said data driver having a timing input coupled to said output of said second PC trace delay line to receive the drive clock signal, and an output port coupled to the SRAM to provide data to the SRAM; and (e) sequencing logic having at least one input coupled to the clock generator, having an output coupled to said dual edge driver to provide an end write signal, and an output coupled to said data driver to provide a drive enable signal.

2. The apparatus of claim 1, wherein said first PC trace delay line is configured to provide a begin write clock signal, and said first input of said dual-edge driver is coupled to the clock generator via said first PC trace delay line to receive said begin write clock signal.

3. The apparatus of claim 2, further comprising a third PC trace delay line configured to provide an end write clock, wherein said second input of said dual edge driver is coupled to the clock generator via said third PC trace delay line to receive said end write clock.

4. The apparatus of claim 3, further comprising:
an address driver having a timing input coupled to said first out-of-phase clock signal output of the clock generator and an output coupled to the SRAM.

5. The apparatus of claim 4, further comprising:
an address bus coupled between said address driver and an address port of the SRAM; and
a data bus coupled between said data driver and a data port of the SRAM.

6. The apparatus of claim 1, further comprising an address driver having a timing input F coupled to the clock generator to receive the second out-of-phase clock signal, and an output coupled to the SRAM to provide an address to the SRAM.

7. The apparatus of claim 6, further comprising:
an address bus coupled between said address driver and an address port C of the SRAM; and
a data bus coupled between said data driver and a data port D of the SRAM.

8. The apparatus of claim 1, further comprising a plurality of clock drivers, configured to drive said first out-of-phase clock signal and said second out of phase clock signal.

9. The apparatus of claim 1, wherein said first PC trace delay line is configured to provide an end write clock signal, and said second input of said dual-edge driver is coupled to the clock generator via said first PC trace delay line to receive said end write clock signal.

10. An apparatus for optimizing cache memory write cycle timing in a microprocessor cache memory system having an SRAM cache memory, a clock generator for generating a first out-of-phase clock signal and second out-of-phase clock signal, and a write-control signal to enable memory writes, the apparatus comprising:

(a) first means for delaying the first out-of-phase clock signal to provide an end-write clock signal;

(b) second means for delaying the second out-of-phase clock signal to provide a drive clock signal;

(c) third means, coupled to the clock generator to receive the first and second out-of-phase clock signals, for providing a write-end signal, and for providing a drive enable signal;

(d) fourth means, coupled to said first means, responsive to the first out-of-phase clock signal, for asserting the write control signal, and further responsive to an end-write edge of the end-write clock signal and said write end signal, for resetting the write control signal;

(e) fifth means, coupled to said second means and responsive to said drive clock signal, and responsive to said drive enable signal, for driving data to the SRAM; and (f) sixth means, responsive to the second out-of-phase clock signal for driving an address to the SRAM.

11. The apparatus of claim 10, further comprising:
an address bus, coupled to said sixth means, for transferring the address between a CPU and the SRAM; and
a data bus coupled to said fifth means, for transferring data between a CPU and the SRAM.

12. An apparatus for optimizing cache memory write cycle timing in a microprocessor cache memory system having an SRAM cache memory, a clock generator for generating a first out-of-phase clock signal and a second out-of-phase clock signal, and a write-control signal to enable memory writes, the apparatus comprising:

(a) first means for delaying the second out-of-phase clock signal to provide a begin write clock signal;

(b) second means for delaying the first out-of-phase clock signal to provide a drive clock signal;

(c) third means, coupled to the clock generator to receive the first and second out-of-phase clock signals, for providing a write-end signal, and for providing a drive enable signal;

(d) fourth means, coupled to said first means, responsive to said begin write clock signal, for asserting the write control signal, and further responsive to an end:write edge, for resetting the write control signal;

(e) fifth means, coupled to said second means and responsive to said drive clock signal, and responsive to said drive enable signal for driving data to the SRAM; and (f) sixth means, responsive to the second out-of-phase clock signal for driving an address to the SRAM.

13. The apparatus of claim 12, further comprising:
an address bus, coupled to said sixth means, for transferring the address between a CPU and the SRAM; and
a data bus coupled to said fifth means, for transferring data between a CPU and the SRAM.

14. The apparatus of claim, 12 further comprising seventh means, coupled to the clock generator, for delaying the first out-of-phase clock signal to provide an end write clock signal having said end write edge.

15. A method for optimizing static random access memory (SRAM) write cycle timing in a microprocessor cache memory system, using a plurality of clock signal edges to control a write cycle, and a write control signal to enable memory writes, the SRAM having tri-state data drivers, the method comprising the steps of:

(1) sending an address to the SRAM at the beginning of the write cycle, using a first transition of a second out-of-phase clock signal that marks the beginning of the write cycle so as to time when said address is sent;

(2) asserting the write control signal and causing the tri-state data drivers of the SRAM to enter a tri-state state, using a first transition 314 of a first out-of-phase clock signal so as to time when the write control signal is asserted, where said first transition 314 of said first out-of-phase clock signal is temporally placed as soon as possible after said address has been valid at address ports C of the SRAM for a sufficient amount of time to meet an address set-up time as specified for the SRAM;

(3) introducing a first delay in said second out-of-phase clock signal to provide a drive clock signal having a begin drive edge 316, where the length of said first delay is based on,
  (a) a phase difference between said first out-of-phase clock signal and said second out-of-phase clock signal, and
  (b) an amount of time required for the tri-state drivers to enter said tri-state state;

(4) driving data to be written to the SRAM after the tri-state drivers have entered said tri-state state, using said begin-drive edge of said drive clock signal provided in said step (3);

(5) introducing a second delay into said first out-of-phase clock signal to provide an end write clock signal having an end write edge, where the length of said second delay is based on,
  (a) a data set-up time of the SRAM,
  (b) said length of said first delay introduced in step (3),
  (c) the phase difference between the first out-of-phase clock signal and second out-of-phase clock signal, and
  (d) uncertainties in timing of begin drive edge and a propagation delay time of data bus;

(6) resetting the write control signal using said end write edge of said end write clock signal provided in said step (5).

16. The method of claim 15, wherein the temporal placement of said first transition of said first out-of-phase clock signal is further constrained by a time at which data 304 from a previous read operation is no longer required on the data bus.

17. A method for optimizing cache memory write cycle timing in a microprocessor cache memory system, using a plurality of clock signal edges to control a write cycle, and a write control signal to enable memory writes, the SRAM having tri-state data drivers, the method comprising the steps of:

(1) sending an address to the SRAM at the beginning of the write cycle, using a first transition of a second out-of-phase clock signal that marks the beginning of the write cycle so as to time when said address is sent;

(2) introducing a first delay into said second out-of-phase clock signal to provide a begin write clock signal having a begin write edge 1006, where the length of said first delay is based on an address setup time for the SRAM;

(3) asserting the write control signal and causing the tri-state drivers of the SRAM to enter a tri-state state, as soon as is possible after the address has been set up in the SRAM, using said begin write edge of said begin write clock signal provided in step (2);

(4) introducing a second delay into a first out-of-phase clock signal to provide a drive clock signal having a begin drive edge, where the length of said second delay is based on,
  (a) an amount of time required for the tri-state drivers of SRAM to enter said tri-state state,
  (b) a phase difference between said second out-of-phase clock signal and said first out-of-phase clock signal, and
  (c) said length of said first delay introduced in step (2); (5) driving data to be written to the SRAM after the tri-state drivers have entered said tri-state state, using said begin drive edge of said drive clock signal provided in said step (4); and (6) resetting the write control signal using an end write edge.

18. The method of claim 17, wherein said length of said first delay introduced in said step (2) is further based on a time at which data from a previous read operation is no longer required at SRAM data port.

19. The method of claim 17, wherein said end write edge of said step (6) is a second positive transition of said first out-of-phase clock signal.

20. The method of claim 17, further comprising a step of introducing a third delay into the first out of phase clock signal to generate an end write clock signal, and wherein said end write edge of said step (6) is an edge of said end write clock signal.

* * * * *

UNITED STATES PATENT AND TRADEMARK OFFICE
CERTIFICATE OF CORRECTION

PATENT NO. : 5,426,771
DATED : 6/20/95
INVENTOR(S) : Thomas A. Asprey, Craig A. Gleason It is certified that error appears in the above-indentified patent and that said Letters Patent is hereby corrected as shown below:

Col. 18, Claim 10, l. 2, insert --a-- before "second"

Col. 18, Claim 12, l. 48, change "end:Write" to --end-write.--

Col. 20, Claim 17, l. 35, after "(2);" start a new paragraph commencing with --(5)--

Signed and Sealed this

Twenty-seventh Day of May, 1997

Attest:

BRUCE LEHMAN

Attesting Officer     Commissioner of Patents and Trademarks